May 8, 1928.
A. SOBERG
1,669,028
RADIO BATTERY CHARGER
Filed June 11, 1926
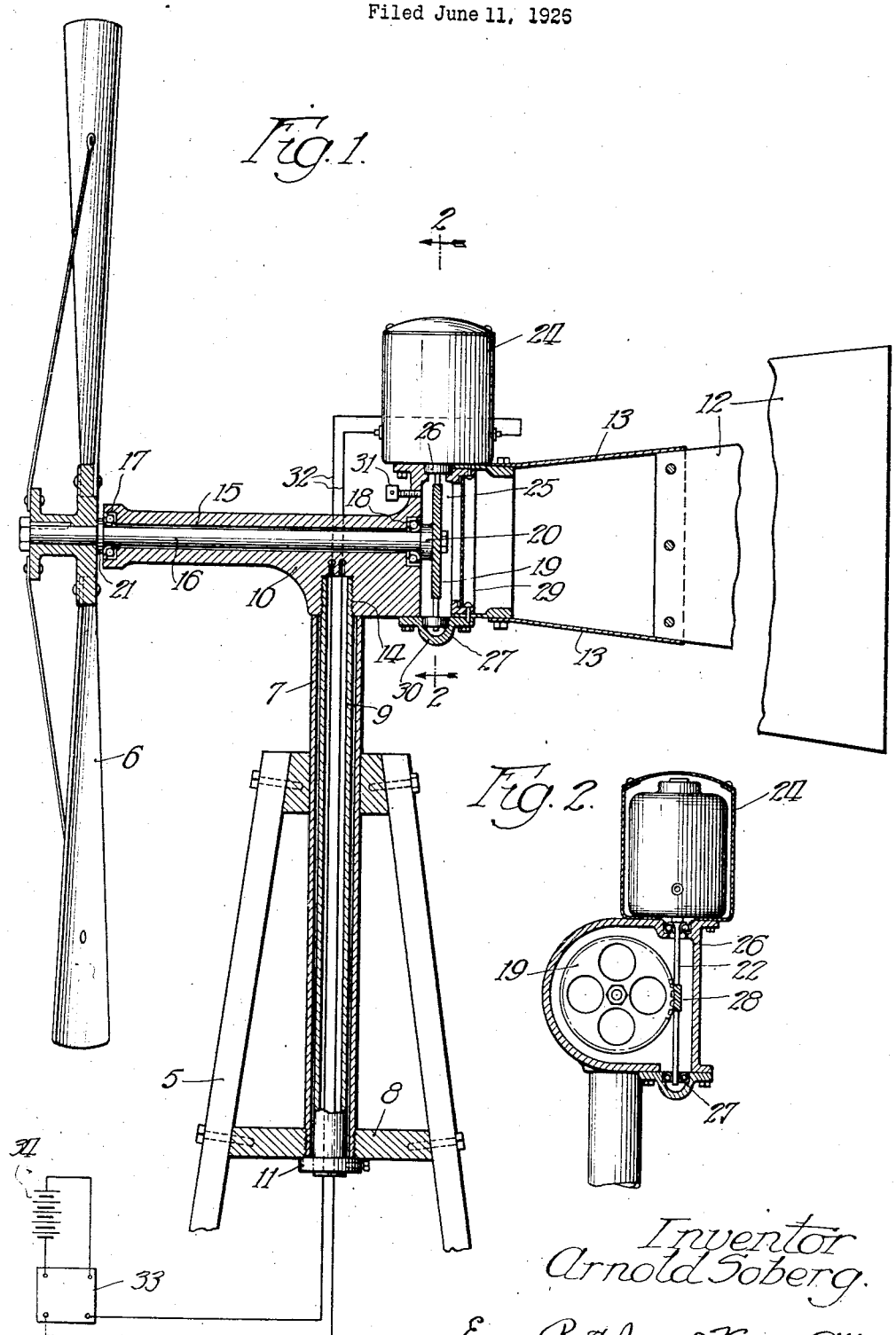
Inventor
Arnold Soberg.
Emery, Booth, Janney & Varney, Attys.

Patented May 8, 1928.

1,669,028

UNITED STATES PATENT OFFICE.

ARNOLD SOBERG, OF MOHALL, NORTH DAKOTA.

RADIO BATTERY CHARGER.

Application filed June 11, 1926. Serial No. 115,197.

This invention relates to apparatus for charging storage batteries and among other objects aims to provide simple and efficient apparatus actuated by wind power which is capable of being used satisfactorily in rural communities where central storage power for recharging batteries is unobtainable. The invention is particularly well adapted for the charging of radio batteries, but its usefulness is not confined to that field.

The invention may be understood by reference to one illustrative embodiment shown in the accompanying drawings, in which:

Fig. 1 is a sectional elevation of the apparatus;

Fig. 2 is a section on line 2—2 of Fig. 1, illustrating the gearing for driving the generator.

At the present time the use of radios in rural communities is widespread, being found even on the most isolated farms. One of the chief drawbacks to radios has been the frequency with which the batteries must be recharged, especially when they are in frequent use during long winter evenings, when reception is particularly satisfactory. As most farms are not provided with electric power, it is necessary for the farmers to travel to the nearest town having battery charging facilities. Such travel is frequently impossible during winter months in Northern States because the roads are blocked with snow drifts. Thus it comes about that at the time when the need for recharging the batteries most frequently arises, it is most difficult to effect such recharging. My invention provides a dependable but inexpensive apparatus capable of recharging storage batteries during the most severe weather conditions and in the most isolated communities.

Referring to the drawnings, there is shown the upper portion of a windmill tower 5 which, being of well known construction, is not fully illustrated. Such a tower may be supported upon the ground conveniently near the farm house, or it may be made fast to the roof of the farm house or barn. Upon the support 5 a windmill 6 is mounted so as to turn with the wind. The mounting shown includes a column 7 secured at its lower end to a base 8 made fast to the support 5 and a tube 9 secured into the body 10 of the windmill and passing through the column 7, upward movement of the windmill being prevented by a collar 11 secured by a set screw to the lower end of the tube 9 and of sufficient diameter to overlap the lower end of the column 7 and engage the base 8. The described construction permits the windmill to rotate freely about the longitudinal axis of the vertical column 7 with said column supporting the windmill. A vane 12 secured by plates 13 to the body 10 permits the windmill to turn responsive to the direction of the wind. The parts so far described are no part of my invention but form a part of an operative structure.

The body 10 of the windmill is preferably provided by a single casting having a screw threaded bore 14 for the tube 9, as shown, and having a longitudinal bore 15 extending horizontally when the windmill is in position so as to receive the windmill shaft 16. In order to take the thrust of the windmill shaft, thrust bearings 17, 18 are secured at opposite ends of the bore 15, and because of their economy and low friction characteristics I prefer to use the turned cone type of ball bearings shown in the drawings. Such bearings carry both the radial and thrust loads of the shaft and are well adapted for heavy service.

At the inner end of the shaft 16 a worm gear 19 is provided, said worm gear being of that type which may be used for driving a worm. In order to hold the ball bearings against displacement, there is a boss or hub 20 on worm gear 19 which fits over the shaft 16 and is abutted against the ball bearing 18 while at the other end of the shaft a collar 21 abuts the ball bearing 17.

The worm gear 19 is used to drive the shaft 22 of a direct current generator 23 which is enclosed within a casing 24 secured by screws to the top of the body 10. As shown, the generator is arranged with its shaft vertical, extending downwardly into the gear compartment 25 provided by the body 10. The generator shaft 22 is supported by two thrust bearings 26, 27 which are similiar to those used for the windmill shaft so as to take the thrust of the rotor of the generator as well as the radial load due to the thrust of the worm wheel upon the worm 28.

In order to give access to the interior of the gear compartment, there is an opening in one side closed by the removable cover 29. The lower bearing 27 may be removed and the lubricant may be drained by taking off the cover 30 which is bolted to the bottom of the casting 10. To supply the gear compartment with oil a force-feed fitting 31 may be screwed into the upper wall of the body 10 so that the gear compartment may be kept substantially full of oil, thereby supplying the bearings with oil so that the windmill will operate efficiently after years of service exposed to the weather.

The generated current is conducted by wires 32, preferably being led through the interior of the tube 9 to an automatic cut-off 33 including a switch (not shown). Such a cut-off is obtainable on the market and serves to prevent overcharging of the battery 34 and also to prevent the battery from discharging and running the generator as a motor.

The described apparatus is mechanically very simple, due to the use of the worm gearing and to the placing of the generator above the housing. Thus while the generator is driven very fast as is necessary, there is no complicated train of gears which would necessitate a large number of bearings, all possible sources of trouble, especially after long exposure to the weather. The generator is completely protected from the possibility of a short circuit due to moisture and it is also removed from the oil bath although its bearings are amply lubricated. In operation, the worm wheel will splash oil about the upper bearing 26, even though the casing is not filled with lubricant.

Obviously the present invention is not restricted to the particular embodiment thereof herein shown and described.

What I claim is:

1. Battery charging apparatus comprising, in combination, a windmill; a direct current generator carried upon the body of the windmill with its shaft vertical; thrust ball bearings sustaining the generator shaft; a worm on the shaft and between the ball bearings; a horizontal windmill shaft; a worm gear on the windmill shaft; thrust ball bearings for the windmill shaft, the parts being so constructed and arranged that the windmill drives the generator shaft.

2. Battery charging apparatus comprising, in combination, a casting; a bore in the casting; a windmill; a windmill shaft extending through the bore; thrust bearings in the bore at the opposite ends; a generator secured to the top of the casting with its shaft vertical; gearing connecting the windmill shaft with the generator shaft; and a housing for the gearing forming an oil-tight reservoir whereby the bearings and gears run in a bath of oil.

3. Battery charging apparatus comprising, in combination, a tower-like supporting structure; a casting at the top of said structure and so mounted as to turn thereon in a horizontal plane; a windmill having its shaft passing through said casting; a generator carried on the casting above the windmill shaft and with its axis vertical; gearing connecting the generator and windmill shaft; said casting having an opening in one side to give access to the gearing and another opening to give access to the bearings; covers for said openings; and a vane secured to the casting to cause the windmill to move into the wind.

In testimony whereof, I have signed my name to this specification.

ARNOLD SOBERG.